United States Patent [19]

Huang

[11] Patent Number: 5,046,250

[45] Date of Patent: Sep. 10, 1991

[54] PIPE CUTTING DEVICE

[76] Inventor: Chi C. Huang, No. 9, Feng Sheh Rd., Ta Sheh Village, Shen Kang Hsiang, Taichung Hsien, Taiwan

[21] Appl. No.: 610,845

[22] Filed: Nov. 8, 1990

[51] Int. Cl.[5] ....................... B23D 21/06; A21C 5/00; B26B 17/00; B26B 17/00

[52] U.S. Cl. ........................................ 30/92; 30/115; 30/241; 30/245

[58] Field of Search ...................... 30/92, 92.5, 96, 97, 30/115, 116, 241, 245, 246

[56] References Cited

U.S. PATENT DOCUMENTS 2,763,926 9/1956 Pate ...................................... 30/241

3,835,860 9/1974 Garretson ............................ 30/241

4,208,792 6/1980 Ewig, Jr. ............................. 30/241

*Primary Examiner*—Frank T. Yost

*Assistant Examiner*—Paul M. Heyrank, Sr.

*Attorney, Agent, or Firm*—Merchant, Gould, Smith, Edell, Welter & Schmidt

[57] ABSTRACT

A cutting device includes a body. A mouth is formed in the front end of the body for receiving a pipe to be cut. A cutter is received in the body and is movable toward the mouth. A gear and an upper end of a handle are pivotally coupled to the body. The gear is engaged with the cutter and is caused to rotate when the handle is pulled so that the cutter can be caused to move forward by the rotation of the gear in order to cut the pipe. The pipe can be cut neatly and efficiently when the handle is repeatedly pulled and released.

4 Claims, 3 Drawing Sheets

PIPE CUTTING DEVICE

BACKGROUND OF THE INVENTION

The present invention relates to a cutting device, and more particularly to a pipe cutting device.

A related U.S. patent application Ser. No. 07/440,130 in the title of "cutting device" was filed on Nov. 21, 1989, by the applicant.

SUMMARY OF THE INVENTION

The primary objective of the present invention is to provide a pipe cutting device which can cut a plastic pipe neatly and efficiently.

In accordance with one aspect of the invention, there is provided a pipe cutting device which includes a body having a bore formed therein and having a grip. A mouth is formed in a front end of the body for receiving a plastic pipe to be cut. A movable member is slidable in the bore of the body. A front end of the movable member is movable out of the bore. A cutter is fixed to the front end of the movable member. A pair of ears are formed on an upper end of a handle and are pivotally coupled to the body by a pin. A gear is rotatably provided on the pin and is engaged with a rack of the movable member. A catch pawl is biased by a spring to engage with the gear so that the gear can be caused to rotate by pulling the handle and so that the cutter can be caused to move forward in order to cut the plastic pipe. A check pawl is biased by a spring to engage with the gear so as to prevent the gear from rotating in a reverse direction. The plastic pipe can be cut neatly and efficiently when the handle is repeatedly pulled and released.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
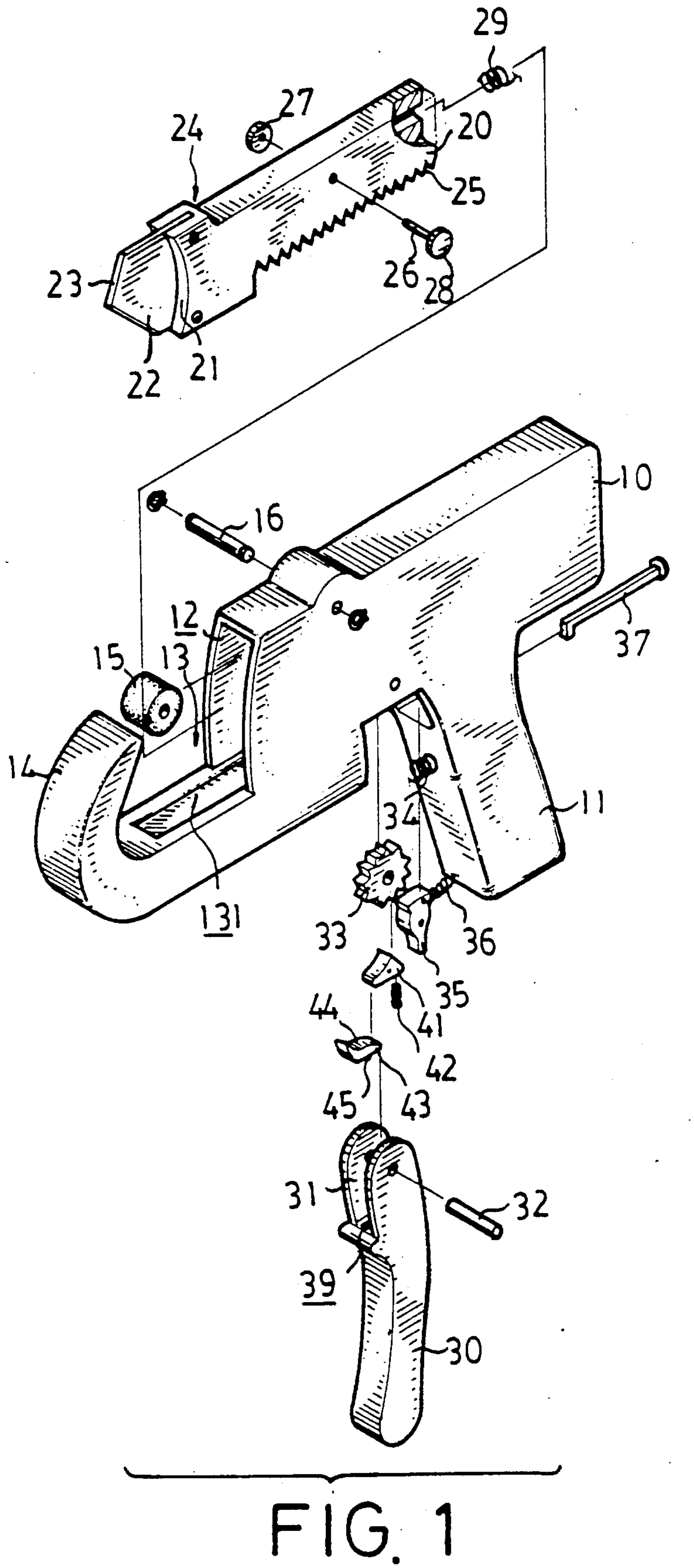
FIG. 1 is an exploded view of a pipe cutting device in accordance with the present invention.
Figure 2:
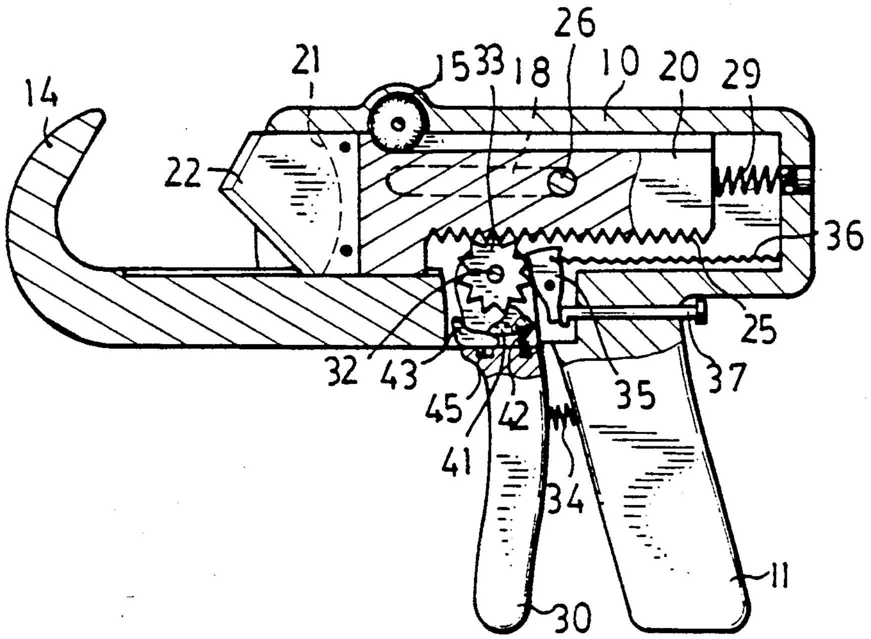
FIG. 2 is a partial cross sectional view of the pipe cutting device.
Figure 4:
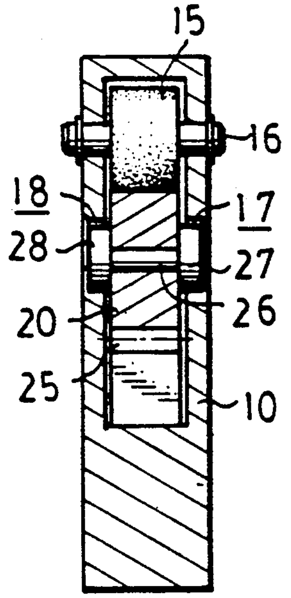
FIG. 4 is a cross sectional view taken along lines 4—4 of FIG. 3.

Referring to the drawings and initially to FIGS. 1 and 2, the pipe cutting device in accordance with the present invention comprises generally a body 10 having a grip member 11 extended downward therefrom so that the body 10 has a shape similar to a gun body. A handle 30 is provided in front of the grip member 11. A bore 12 is longitudinally formed in the body 10. A fixed jaw member 14 is provided on the front end of the body 10 so that a mouth 13 is formed between the fixed jaw member 14 and the body 10. A plastic pipe 90 to be cut can be disposed in the mouth 13. A roller 15 is rotatably supported in the middle of an upper and inner portion of the body 10. A pair of oblong holes 17, 18 (FIG. 4) are formed in the inner surfaces of the side walls of the body 10 and are communicated with the bore 12. The oblong holes 17, 18 extend in a direction parallel to a longitudinal direction of the body 10.

A movable member 20 is engageable within the bore 12. A curved abutment face 21 is formed on the front end of the movable member 20. A triangularly shaped cutting element 22 which has converging cutting edges 23 formed on a front end thereof is fixed to the front end of the movable member 20 and is movable toward the jaw member 14. A shoulder 24 is formed on the front portion of the upper surface of the movable member 20. A rack 25 is formed on the lower surface of the movable member 20. A pair of discs 27, 28 are rotatably coupled to the movable member 20 by a pin 26. The discs 27, 28 are slidably engaged within the oblong holes 17, 18 of the body 10 so that the movable member 20 is guided to move longitudinally along the bore 12 of the body 10. The roller 15 contacts the upper surface of the movable member 20 for facilitating a sliding movement of the movable member 20. An extension spring 29 is coupled between the rear end of the movable member 20 and the rear end of the body 10 so that the movable member 20 has a tendency to move rearward toward the rear end of the body 10. A slot 131 is formed below the mouth 13 for receiving the lower edge of the movable member 20 and for guiding the movable member 20 to move straight forward without moving laterally.

Two ears 31 are formed on the upper end of the handle 30 and are pivotally coupled to the body 20 by a pin 32. A slot 39 is formed in the upper end of the handle 30. A gear 33 is rotatably supported on the pin 32 between the two ears 31 of the handle 30. The gear 33 is engaged with the rack 25 of the movable member 20 so that the movable member 20 can be caused to move along the bore 12 of the body 10 by a rotation of the gear 33. A spring 34 is biased between the middle portions of the handle 30 and the grip member 11 so that the handle 30 can be biased forward away from the grip member 11 by the spring 34.

Figure 5:
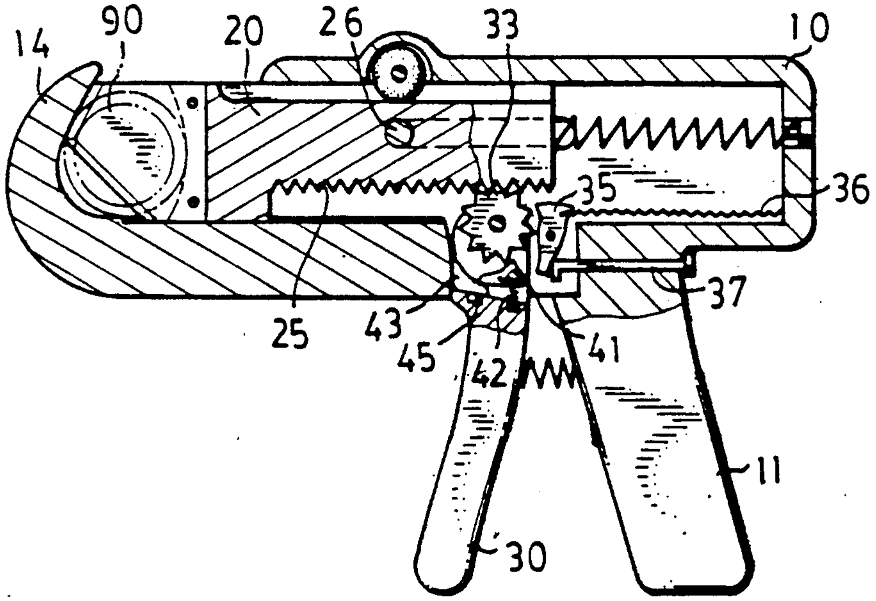
FIG. 5 is a partial cross sectional view similar to FIG. 3, illustrating a release operation of the handle.

A middle portion of a check pawl 35 is pivotally coupled to the upper end of the grip member 11. A compression spring 36 is coupled between the upper end of the check pawl 35 and the rear end of the body 10 in order to bias the upper end of the check pawl 35 forward to engage with the gear 33 so that the gear 33 is prevented from rotating clockwise (FIGS. 2 and 3) when the check pawl 35 is engaged with the gear 33. An arm 37 is slidably and laterally supported in the upper end of the grip member 11. The rear end of the arm 37 extends out of the grip member 11, and the front end of the arm 37 contacts the lower end of the check pawl 35. When the arm 37 is pushed forward against the bias force of the compression spring 36 in order to push the lower end of the check pawl 35 forward, the upper end of the check pawl 35 is separated from the engagement with the gear 33 so that the gear 33 can rotate clockwise (FIG. 5). This is an active direction for cutting the plastic pipe.

Figure 3:
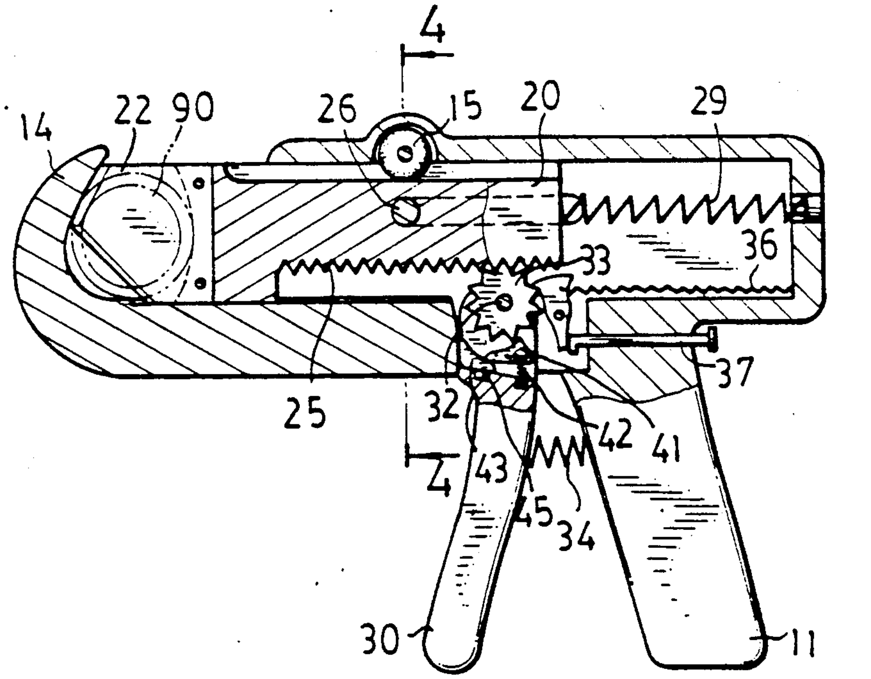
FIG. 3 is a partial cross sectional view similar to FIG. 2, illustrating an operation of the pipe cutting device.

A middle portion of a catch pawl 41 is pivotally coupled between the ears 31 below the gear 33. A spring 42 is biased between the rear end of the catch pawl 41 and the upper end of the handle 30 in order to push the catch pawl 41 to engage with the gear 33. A wedge member 43 has a curved upper surface 44 and has a key 45 formed on the lower surface thereof. The key 45 is slidably engaged and received within the slot 39 of the handle 30 so that the wedge member 43 can be guided to slide either forward (FIG. 2) or rearward (FIG. 3) by the engagement between the key 45 and the slot 39. The front end of the catch pawl 41 slidingly contacts the curved upper surface of the wedge member 43. As shown in FIG. 3, when the handle 30 is biased forward by the spring 34, the wedge member 43 will contact the body 10 and will be relatively pushed rearward by the body 10. At this moment, the front end of the catch pawl 41 will be pushed upward by the wedge member 43 so that the catch pawl 41 is separated from the engagement with the gear 33. As shown in FIG. 2, when the handle 30 is pulled rearward against the spring 34, the front end of the catch pawl 41 no longer contacts the body 10. At this moment, the wedge member 43 is pushed forward by the front end of the catch pawl 41 and the spring 42 biases the rear end of the catch pawl 41 upward to engage with the gear 33 so that the gear 33 is caused to rotate counterclockwise and so that the movable member 20 is caused to move forward in order to cut the pipe disposed in the mouth 13. Repeat pulling and releasing the handle 30, the cutting element 22 can be caused to move forward to cut the plastic pipe 90 disposed in the mouth 13.

Accordingly, the pipe cutting device in accordance with the present invention can cut the plastic pipes neatly and efficiently.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A pipe cutting device comprising:

a body having a bore longitudinally formed therein, a fixed jaw member being provided on a front end of said body so that a mouth is formed between said fixed jaw member and said body in order to receive a plastic pipe to be cut, a grip member extending downward from said body;

a movable member slidably provided in said bore of said body, a front end of said movable member being extendible out of said bore and movable toward said fixed jaw member, a rack being formed on a lower surface of said movable member;

a cutting element being fixed to said front end of said movable member;

a first spring being coupled between a rear end of said movable member and a rear end of said body in order to bias said movable member rearward;

a pair of ears being formed on an upper end of a handle and being pivotally coupled to said body by a pin, said handle being located in front of said grip member;

a second spring being coupled between a middle portion of said handle and said grip member for biasing said handle forward;

a gear being rotatably provided on said pin and engaging with said rack of said movable member;

a middle portion of a catch pawl being pivotally coupled between said ears, a rear end of said catch pawl being biased by a third spring in order to engage with said gear so that said gear can be caused to rotate in an active direction by a pulling of said handle and so that said cutting element can be caused to move forward in order to cut said plastic pipe, a wedge member being provided to cause a front end of said catch pawl to move up and down so that an engagement between said catch pawl and said gear can be controlled by a movement of said wedge member; and a middle portion of a check pawl being pivotally coupled in said body, an upper end of said check pawl being biased by a fourth spring in order to engage with said gear so that said gear can be prevented from rotating in a reverse direction relative to said active direction; and when said handle is repeatedly pulled and released, said cutting element and said movable member can be caused to move forward toward said fixed jaw member so that said plastic pipe can be cut by said cutting element.

2. A pipe cutting device according to claim 1, wherein a roller is rotatably coupled in an upper portion of said body and slidingly contacts an upper surface of said movable member, a pair of oblong holes are formed in an inner surface of each of the side walls of said body and communicated with said bore, said oblong holes are parallel to a longitudinal direction of said body, a pair of discs are rotatably coupled on said movable member and are slidably received in said oblong holes respectively in order to facilitate a sliding movement of said movable member.

3. A pipe cutting device according to claim 1, wherein said fourth spring is a compression spring and is coupled between said upper end of said check pawl and said rear end of said body so that said upper end of said check pawl can be biased to engage with said gear in order to prevent said gear from rotating in said reverse direction, an arm is laterally provided in an upper portion of said grip member, a rear end of said arm extends out of said grip member, a front end of said arm contacts a lower end of said check pawl so that said upper end of said check pawl can be separated from said gear when said arm is pushed forward in order to push said lower end of said check pawl forward.

4. A pipe cutting device according to claim 1, wherein a slot is formed in said upper end of said handle, said wedge member has a key formed in a lower surface thereof and has a curved upper surface in contact with said front end of said catch pawl, said key is slidingly received in said slot and is slidable relative to said catch pawl so that said front end of said catch pawl can be caused to move up and down by said wedge member.

* * * * *